United States Patent [19]

Woermbke

[11] Patent Number: 4,477,993

[45] Date of Patent: Oct. 23, 1984

[54] FISH NET

[76] Inventor: James D. Woermbke, 304 2nd Ave., SW., Glen Burnie, Md. 21061

[21] Appl. No.: 416,566

[22] Filed: Sep. 10, 1982

[51] Int. Cl.³ .............................................. A01K 77/00
[52] U.S. Cl. ...................................................... 43/11
[58] Field of Search ................ 43/11, 12, 1; 210/471; 150/52 R, 52 G

[56] References Cited

U.S. PATENT DOCUMENTS

| | | | |
|---|---|---|---|
| 619,065 | 2/1899 | Bjornsen | 43/11 |
| 1,609,656 | 12/1926 | Mastrukoff | 210/471 |
| 2,432,662 | 12/1947 | Gardner | 150/52 R |
| 2,532,052 | 11/1950 | Berman | 210/471 |
| 2,597,447 | 5/1952 | Bruns | 43/11 |
| 2,653,403 | 9/1953 | Oslund | 43/11 |
| 2,772,502 | 12/1956 | Norris | 43/11 |
| 2,783,573 | 3/1957 | Rau | 43/11 |
| 2,818,670 | 1/1958 | Darkenwald | 43/11 |
| 4,139,961 | 2/1979 | Markos | 43/12 |
| 4,169,331 | 10/1979 | Baker | 43/11 |
| 4,272,906 | 6/1981 | Liebling | 43/11 |

Primary Examiner—Gene P. Crosby
Attorney, Agent, or Firm—Schwartz, Jeffery, Schwaab, Mack, Blumenthal & Koch

[57] ABSTRACT

A fist net or the like having a removable cover comprises a loop frame, a net on the frame, an handle attached to the frame, and an elastic cover moveable from an extended position covering the loop and net to a retracted position and occupying a compacted volume adjacent to the handle. A locking means secures the cover to the apex of the loop frame, and a release mechanism in the handle releases the locking means by movement of a connecting wire joining the locking and releasing means.

9 Claims, 8 Drawing Figures

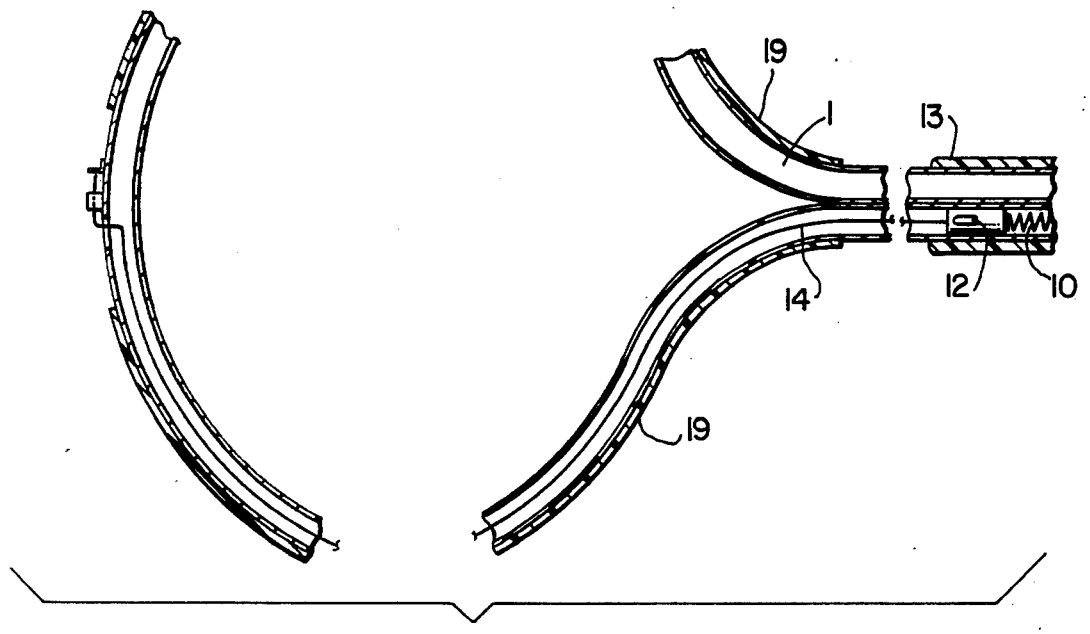
FIG. 4
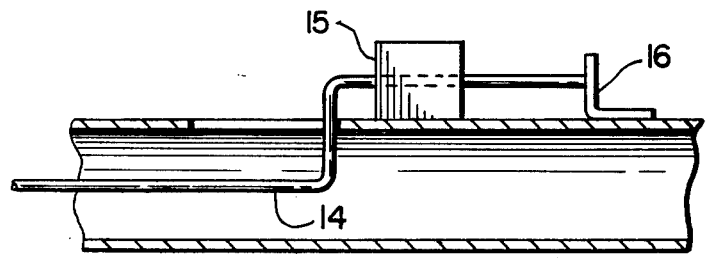
FIG. 5
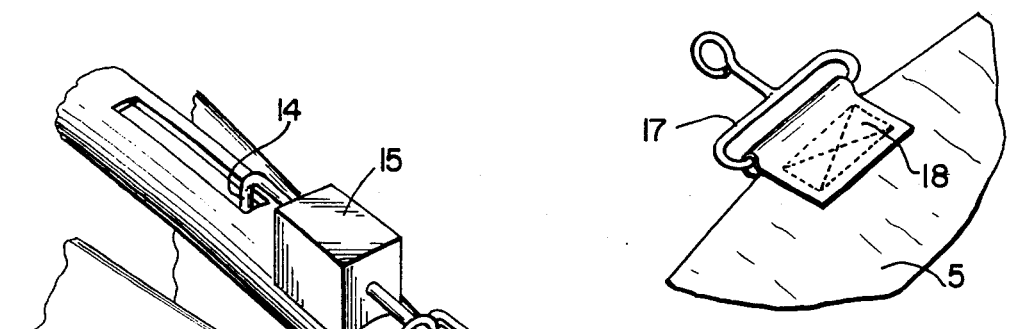
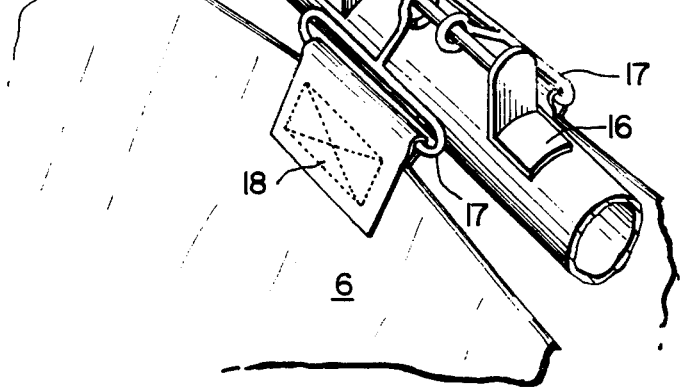
FIG. 6
FIG. 7

FISH NET

BACKGROUND OF THE INVENTION

1. Field of the Invention

The invention relates to fish nets, particularly nets of the type having a retractable elastic cover.

2. Prior Art

It is not uncommon for fish nets to become entangled with underbrush, briars and fishing line when the net is not in actual use.

Prior art housed or retractable nets have been impractical for the reason that the netting frame portion must be collapsed and withdrawn into the handle or the like. With such devices the collapsible frame is greatly weakened, and there is a problem of the existence of rust and friction which prevents a prompt release.

Other prior art nets, such as U.S. Pat. No. 2,772,502, utilize a large rigid pan-shaped enclosure into which the complete net-frame assembly is retracted. Prior art devices of this type are also impractical in that the mechanical configuration, namely the length, suddenly changes when the net-frame assembly is deployed for use. The rigid pan-shaped enclosure also presents considerable wind and water resistance during use, as well as increasing the nonfunctional weight of the unit.

U.S. Pat. Nos. 619,065, 2,653,403 and 4,272,906 illustrate devices which have means to project over the net once a fish or animal is netted so that the fish has a reduced opportunity to escape. Obviously, these devices do not have means for retaining the net in a nondeployed state.

OBJECTS AND SUMMARY OF THE INVENTION

It is a principal object of the present invention to provide a fish net having a fixed shaped, sturdy net-frame assembly, together with a lightweight, retractable fabric cover.

A further object is to have a cover design that retracts into a decreased volume so as to minimize the adverse effect when the netting material is deployed for use.

Yet another object of the invention is to provide a fishing net incorporating a retractable fabric cover for the purpose of protecting the netting material from becoming entangled, while at the same time having a minimal effect on the basic net-frame assembly relative to size, weight, reliability, strength and application.

Another object of the invention is to provide a design whereby neither the retractable cover nor the netting material will obstruct or inhibit the movable parts when the cover is retracted.

An object is to provide a fishing net with a removable cover wherein the distance from the handle to the center of the net is fixed with the cover on or off.

Still another object of the invention is to provide a simple, reliable and easily operated spring-release mechanism incorporated in the net handle.

Another object of the invention is to provide a fish net construction wherein the net, namely, the net-frame, mesh netting material and handle portion do not collapse or change physical shape, but rather have as an integral part thereof a protective retaining cover which encloses the netting material when not in use.

A fish net or the like having a removable cover comprises a loop frame, a net on the frame, a handle attached to the frame, and a cover moveable from an extended position covering the loop and net to a retracted position adjacent the handle. A locking means secures the cover to the apex of the loop frame, and a release mechanism in the handle releases the locking means by movement of a connecting wire joining the locking and releasing means.

The invention utilizes an elastic cover applied to a standard netframe assembly with a simple release mechanism added. It can be manufactured at low relative cost and is reliable in use. An important consideration is that the cover does not alter the geometry or weaken the frame structure. The addition of the cover has minimal impact on weight and does not exhibit adverse effects during use as do earlier designs described in the literature.

BRIEF DESCRIPTION OF THE DRAWINGS

The above and other objects of the invention will become readily apparent from the following detailed description when taken in conjunction with the accompanying drawings, wherein:

FIG. 4 is a fragmentary top plan, sectional view of the frame and latch/release mechanism;

FIG. 5 is an enlarged side, sectional view of the lock-/release latch mechanism;

FIG. 6 is a fragmentary perspective view of the attachment of a strap clip to the fabric cover;

FIG. 7 is a perspective view of the lock/release mechanism with the cover clip in place for extended cover conditions;

DETAILED DESCRIPTION OF THE INVENTION

Figure 1:
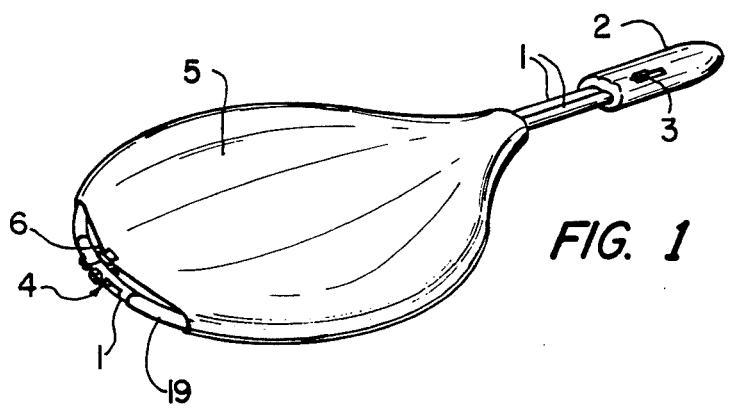
FIG. 1 is a perspective view of the net-frame assembly with the cover fully extended and surrounding the netting material.

Referring to FIG. 1, a metal loop frame structure 1 includes a primary handle 2 housing an integral spring-loaded release mechanism 3 therein and a lock/release latch 4, all of which will be discussed in greater detail below.

An elastic fabric cover 5 is securely attached to the metal frame 1 at one end thereof adjacent handle 2. When cover 5 is extended as seen in FIG. 1, it may be locked in place by a locking means including a locking ring 6.

Figure 2:
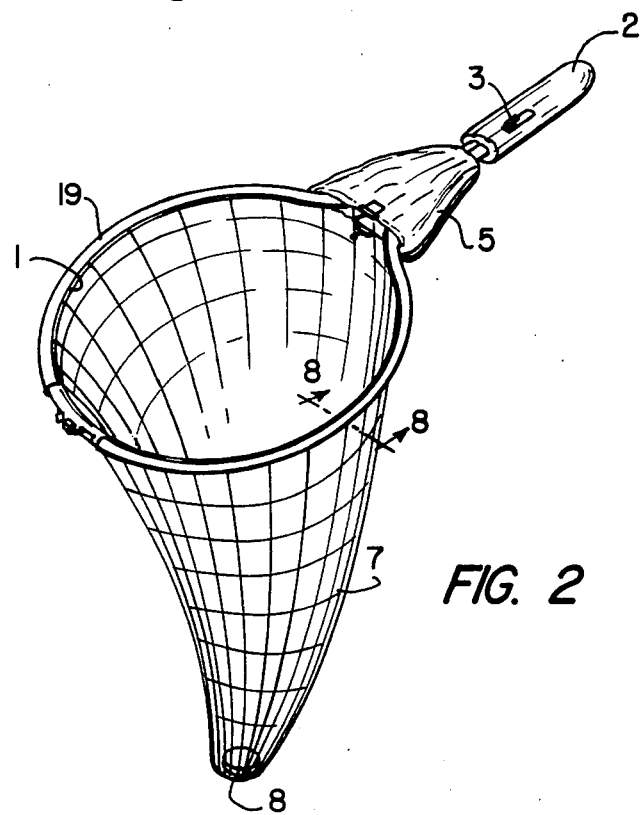
FIG. 2 is a perspective view of the net-frame assembly with the cover retracted and the netting material deployed for use.

Referring to FIG. 2, a mesh net 7 has a weight 8 at the bottom thereof and is seen deployed for use with the cover 5 in its retracted position. The weight 8, attached to the bottom of the mesh net 7, aids in the proper deployment of the net.

Figure 3:
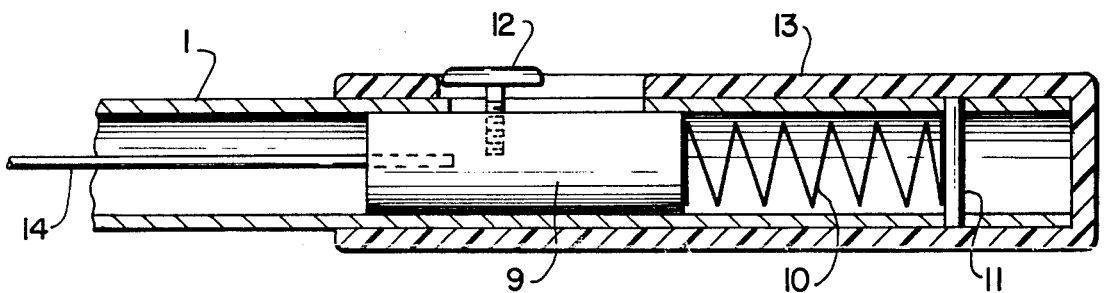
FIG. 3 is an enlarged section view of the handle and release mechanism.

The primary release mechanism 3 seen generally in FIGS. 1 and 2 is illustrated in detail in FIG. 3 wherein the mechanism 3 mounted within the handle 2 comprises a piston 9 which is free to slide within the frame tube 1 and is spring-loaded with an elongated coil spring 10 which abuts against a locking pin 11 inserted through the frame tubing 1 to retain the spring 10 within the tube. A release button 12 extends through an opening in a handle cover 13 and is screw threaded into the piston 9. A connecting wire 14 is firmly attached at one end to the piston 9 and extends through one side of the tubing (as seen in FIG. 4) to a primary lock/release latch mechanism 4 seen in detail in FIGS. 5-7. The lock/release latch mechanism 4 is seen in FIGS. 1 and 4 as being located at the center apex of the tubular frame 1.

Referring to FIG. 5, one end of the lock/release latch 4 comprises the connecting wire 14 extending through a support block 15 and abuts a leaf spring 16 abutment. The support block 15 serves as a cylinder through which the connection wire 14 slides and is also a rugged structural support to prevent the connecting wire 14 from torquing or twisting when subjected to forces applied to it by the elastic cover 5 when the cover is extended over the frame 1. The leaf spring 16 prevents a plurality of attachment clips 17 from sliding off the end of the wire 14 that protrudes from the support block 15.

As will be seen in FIG. 7, the primary lock/release mechanism 4 with two cover attachment clips 17 are in place holding the cover 5 in the extended or closed position. As shown, the forces exerted by the stretched cover 5 through the clip 17 are normal in direction to the section of the connecting wire 14 which is protruding from the support block 15. When the connecting wire 14 is slid to the left (as seen in FIGS. 5 and 7) by moving release button 12 to the right (as seen in FIG. 3), the retaining clips 17 slide off the end of the connecting wire 14, thus releasing the two sides of the elastic cover 5. The mechanical forces induced within the cover itself, due to the elastic nature of the fabric or by elastic bands sewn into the basic cover material, causes the cover to retract from around the net frame and into a small compact volume around the handle extension as seen in FIG. 2.

Figure 8:
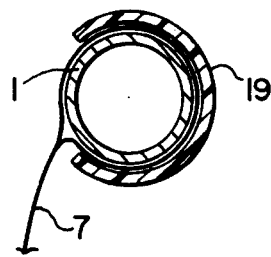
FIG. 8 is a sectional view taken along lines 8—8 in FIG. 2.

A seen in FIG. 4 and in detail in FIG. 8, a smooth surface in the form of a slip ring 19 is wrapped around the outside edges of the tubular frame 1, thus providing a smooth surface upon which the cover material 5 may slide. The ring 19 may be fabricated from any suitable material such as plastic, metal or fiber which can be configured to the desired geometry of the tubular frame 1 and surrounding net 7.

Replacement of the cover itself is accomplished by restretching cover 5 over the frame 1 to the position seen in FIG. 1 snapping the two retainer rings 17 into position by inserting them between the end of the protruding connecting wire 14 and the leaf spring or abutment 16. The cover fabric should exhibit the characteristics of being strong, light in weight, water repellant, resistent to snagging and tearing, mildew resistant, and resistant to becoming caught or entangled in briars or underbrush. It should also have a low volume to strength ratio, i.e., can be "bunched" into a minimum volume. For the intended application, a stretch ratio of about 4 to 1 is desirable. This combination of properties may be achieved by but not limited to the usage of lightweight nylon materials having a built-in elastic property or a nylon fabric with elastic bands attached to or incorporated in the cover material. This can be accomplished wherein the cover material is pleated and sewn to a plurality of elastic bands. As the pleated cover 5 is pulled into the position seen in FIG. 1, the elastic bands stretch. When the cover is released, the elastic bands contract, pulling the cover in a pleated manner back to the position seen in FIG. 5. The quantity, strength and length of the elastic bands would be determined by the desired force pattern for the fabric cover to insure smooth and proper retraction.

While an embodiment of the invention has been described, it will be understood that it is capable of further modifications, and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:

1. A fish net or the like having a removable cover comprising:
    (a) a loop frame structure,
    (b) a handle on said loop frame,
    (c) a net attached to said loop frame,
    (d) a flexible, elastic cover having means for providing a first extended position substantially completely covering said net and loop frame and means wherein said cover is adapted to be movable to a second position wherein said cover is slidably retracted and contracted for uncovering said net and loop frame and being located adjacent to and substantially surrounding said handle.

2. A fish net as defined in claim 1 including:
    (a) means for locking said cover to said loop frame, and
    (b) means for releasing said locking means.

3. A fish net as defined in claim 2 wherein said releasing means includes a piston in said handle, means for biasing said piston toward said loop frame and a release button extending from said piston through said handle whereby said button is accessible from the exterior of said handle.

4. A fish net as defined in claim 2 including means for connecting said locking means and said releasing means.

5. A fish net as defined in claim 4 wherein said connecting means is a wire.

6. A fish net as defined in claim 5 wherein said wire is at least partially enclosed in said loop frame.

7. A fish net as defined in claim 5 wherein said locking means includes support block on said loop frame, said wire extending through said block and means for releasably retaining said cover to said wire.

8. A fish net as defined in claim 1 or 6 including a slip ring around the outside of at least a portion of said loop frame.

9. A fish net as defined in claim 4 or 5 wherein said locking means includes means for retaining said cover to said connecting means.

* * * * *